(No Model.)  2 Sheets—Sheet 1.

H. W. CORNELL.
Corn Sheller.

No. 233,733. Patented Oct. 26, 1880.

Witnesses:

Inventor:
H. W. Cornell (No Model.)

2 Sheets—Sheet 2.

H. W. CORNELL.
Corn Sheller.

No. 233,733. Patented Oct. 26, 1880.

Witnesses:

Inventor:

UNITED STATES PATENT OFFICE.

HARMON W. CORNELL, OF OWEGO, NEW YORK.

CORN-SHELLER.

SPECIFICATION forming part of Letters Patent No. 233,733, dated October 26, 1880.

Application filed April 3, 1880. (No model.)

*To all whom it may concern:*

Be it known that I, HARMON W. CORNELL, of Owego, in the county of Tioga, and in the State of New York, have invented certain new and useful Improvements in Corn-Shellers; and I do hereby declare that the following is a full, clear, and exact description thereof, reference being had to the accompanying drawings, and to the letters of reference marked thereon, making a part of this specification.

My invention relates to corn-shellers having a revolving disk with a series of concentric circles of projecting teeth and a revolving wheel having a beveled rim with teeth or corrugations; and it consists in the peculiar arrangement of the parts whereby the entire surface of the revolving disk is utilized for shelling purposes.

It also consists in a guard, in combination with the other parts, for holding the ear of corn to the disk below its center, all as hereinafter more fully set forth.

In order to enable others skilled in the art to which my invention appertains to make and use the same, I will now proceed to describe its construction and operation, referring to the annexed drawings, in which—

Figure 1:
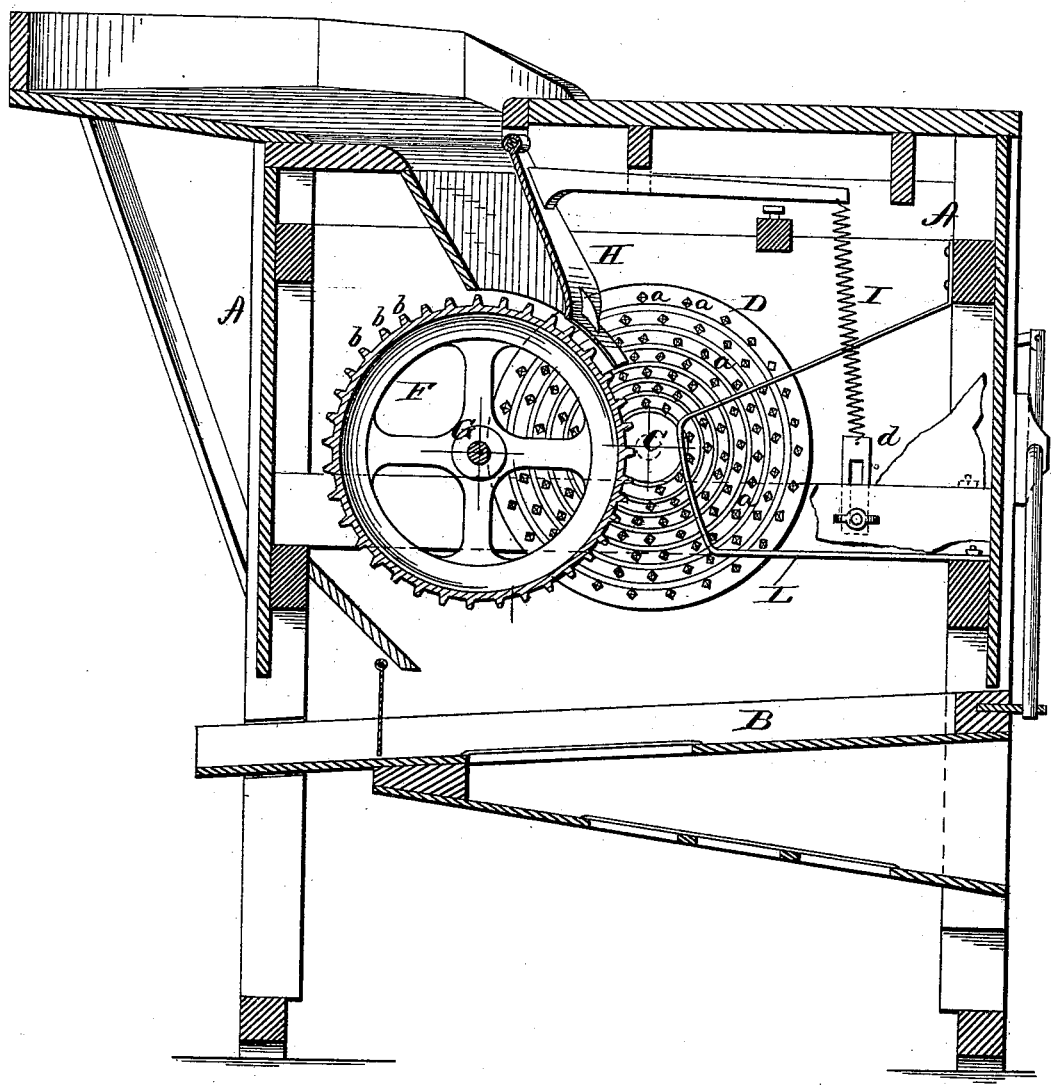
Figure 2:
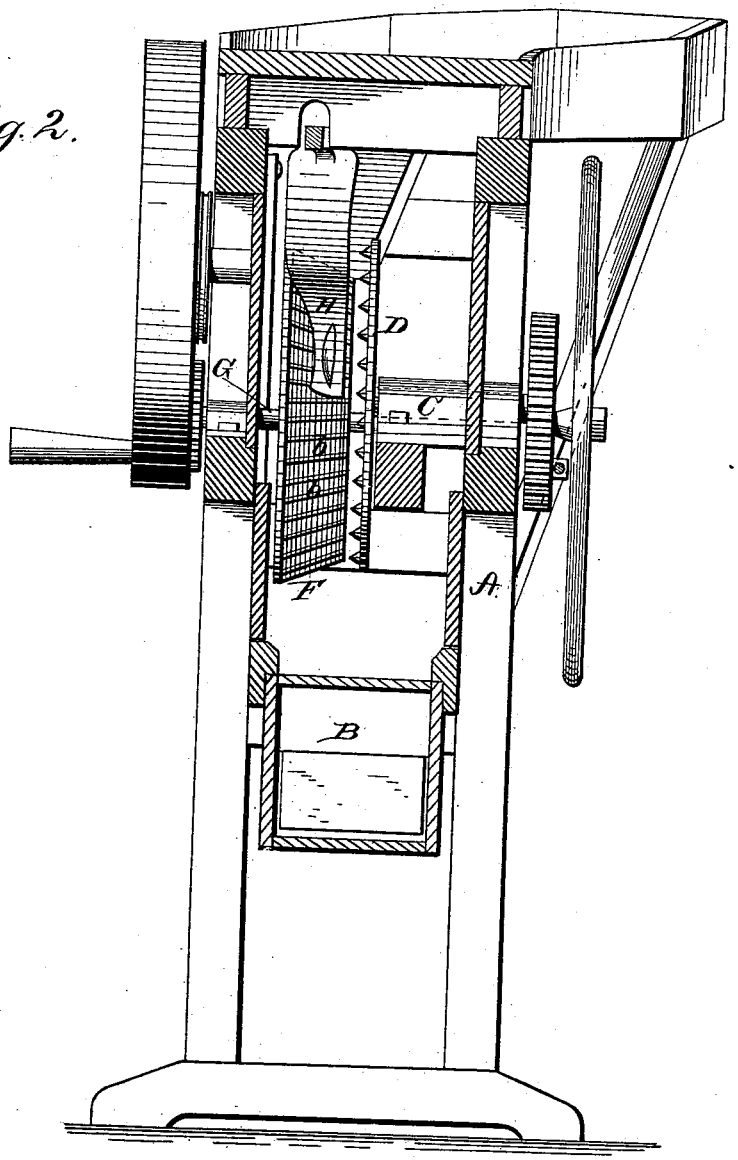

Figure 1 is a longitudinal vertical section of a corn-sheller embodying my invention. Fig. 2 is a vertical cross-section of the same.

A represents the frame-work of my corn-sheller, provided in the lower portion with the usual separator, B, to separate all the chaff, &c., from the shelled corn. This separator may be operated in any suitable manner from the gearing of the machine.

Within the frame-work A is a circular disk, D, secured upon the end of a shaft, C, and this disk is, upon its inner face, provided with teeth $a$, which are arranged in a series of concentric circles, as shown.

F represents a wheel, secured upon a shaft, G, and having its rim beveled or inclined toward the disk D, and upon this rim are a series of equidistant ribs or elongated teeth, $b$.

In the angle between the wheel F and disk D works the angular presser-bar H, having a spring, I, connected to its upper arm, and the tension of this spring is regulated by means of a slotted plate, $d$.

In corn-shellers of this class the disk D is generally placed upon a shaft which runs across the frame, and has a bearing on each side of the disk; and in such construction the wheel F must be set sufficiently far back to allow the cobs to pass down below the shaft, and hence a great portion of the surface of the disk is lost for shelling purposes, so that to get a proper length of shelling-surface it is necessary to make this disk very large.

In my invention the disk D is secured on the end of the shaft, leaving the space in front perfectly clear; and by reason of this construction I am enabled to set the shaft G so close to the disk D that the wheel F will have its larger periphery opposite, or nearly opposite, to the center of the disk, and hence the entire surface of the disk from the center to the circumference is utilized for shelling purposes. As a consequence the disk and wheel may be made of less size, and yet have the same amount of shelling-surface.

The two shafts C and G are connected and rotated by means of suitable gearing, substantially in the manner shown, or in any other convenient manner that will make them run at different speed, as the wheel F must be run faster than the disk D.

The shaft C, which carries the disk D, must also be more or less elevated—say from one-fourth to three-fourths of an inch—above the shaft G, so as to give the desired draft for running the ears of corn through the machine.

This draft may be changed as desired by putting thicker or thinner washers or plates under the box or bearing for the shaft C, or by babbitting the box.

L represents a guard, attached to the end of the frame, and extending in front of the disk opposite the wheel F and below the center of the disk, so as to hold the cobs in position and against the wheel after they pass from under the presser-bar.

Having thus fully described my invention, what I claim as new, and desire to secure by Letters Patent, is—

In combination with the toothed disk D, mounted on the end of the shaft C, and the wheel F, mounted on the shaft G, and extending across the face of the disk from its periphery to its center, the presser-bar H, and guard L, adapted to feed and guide the ear from the periphery to the center of the disk, substantially as specified.

In testimony that I claim the foregoing I have hereunto set my hand this 3d day of April, 1880.

HARMON W. CORNELL.

Witnesses:
J. J. McCARTHY,
H. J. ENNIS.